United States Patent [19]
Anderson

[11] Patent Number: 5,226,387
[45] Date of Patent: Jul. 13, 1993

[54] SELF-LATCHING STANCHION AND OPERATOR SYSTEM

[76] Inventor: Bernard O. Anderson, 5341 W. Banff La., Glendale, Ariz. 85306

[21] Appl. No.: 832,736

[22] Filed: Feb. 7, 1992

[51] Int. Cl.⁵ .............................................. A01K 1/06
[52] U.S. Cl. .................................................. 119/148
[58] Field of Search .................... 119/148, 149, 147.1, 119/150

[56] References Cited

U.S. PATENT DOCUMENTS

| | | | |
|---|---|---|---|
| 1,234,044 | 7/1917 | Kugler. | |
| 2,625,907 | 1/1953 | Montero | 119/148 |
| 3,863,604 | 2/1975 | Nielsen et al. | 119/148 |
| 4,037,566 | 7/1977 | Albers | 119/147 |
| 4,051,813 | 10/1977 | Albers | 119/148 |
| 4,055,149 | 10/1977 | Haiges | 119/147 |
| 4,150,638 | 4/1979 | Vandenberg et al. | 119/148 |
| 4,185,592 | 1/1980 | Albers, Sr. | 119/148 |
| 4,377,131 | 3/1983 | Vandenberg et al. | 119/148 |
| 4,457,265 | 7/1984 | Anderson | 119/148 |
| 4,476,815 | 10/1984 | Albers, Sr. | 119/147 R |
| 4,495,897 | 1/1985 | Albers, Sr. | 119/148 |
| 4,867,105 | 9/1989 | Hatfield | 119/148 |
| 4,930,452 | 6/1990 | DaSilveira | 119/148 |
| 4,976,224 | 12/1990 | Hatfield | 119/148 |

Primary Examiner—Gene Mancene
Assistant Examiner—Thomas Price
Attorney, Agent, or Firm—Charles E. Cates

[57] ABSTRACT

An improved cattle stanchion has a frame supporting animal restraint mechanism having a moveable restraint wand and moveable wand support bar that cooperate in moving to various operative positions. The restraint wand is hinged between its ends to the knee of the support bar. The upper end of the restraint wand cooperates with a pin moveable in an arcuate slot in the upper horizontal frame, which slot pin may also be set by hand, and the upper end of the support bar is hinged in the upper frame while the bottom end of the bar is manipulated in an oscillating, dipping movement, controlled by movement of a bus bar that may be extended to control a long row of such sections. The upper end of the support bar may also be released manually to widen the space to release a downed cow. The positions may be set for free feed, self-catch, lock-out and various permutations by movement of a control for the bus bar, or manually.

10 Claims, 6 Drawing Sheets

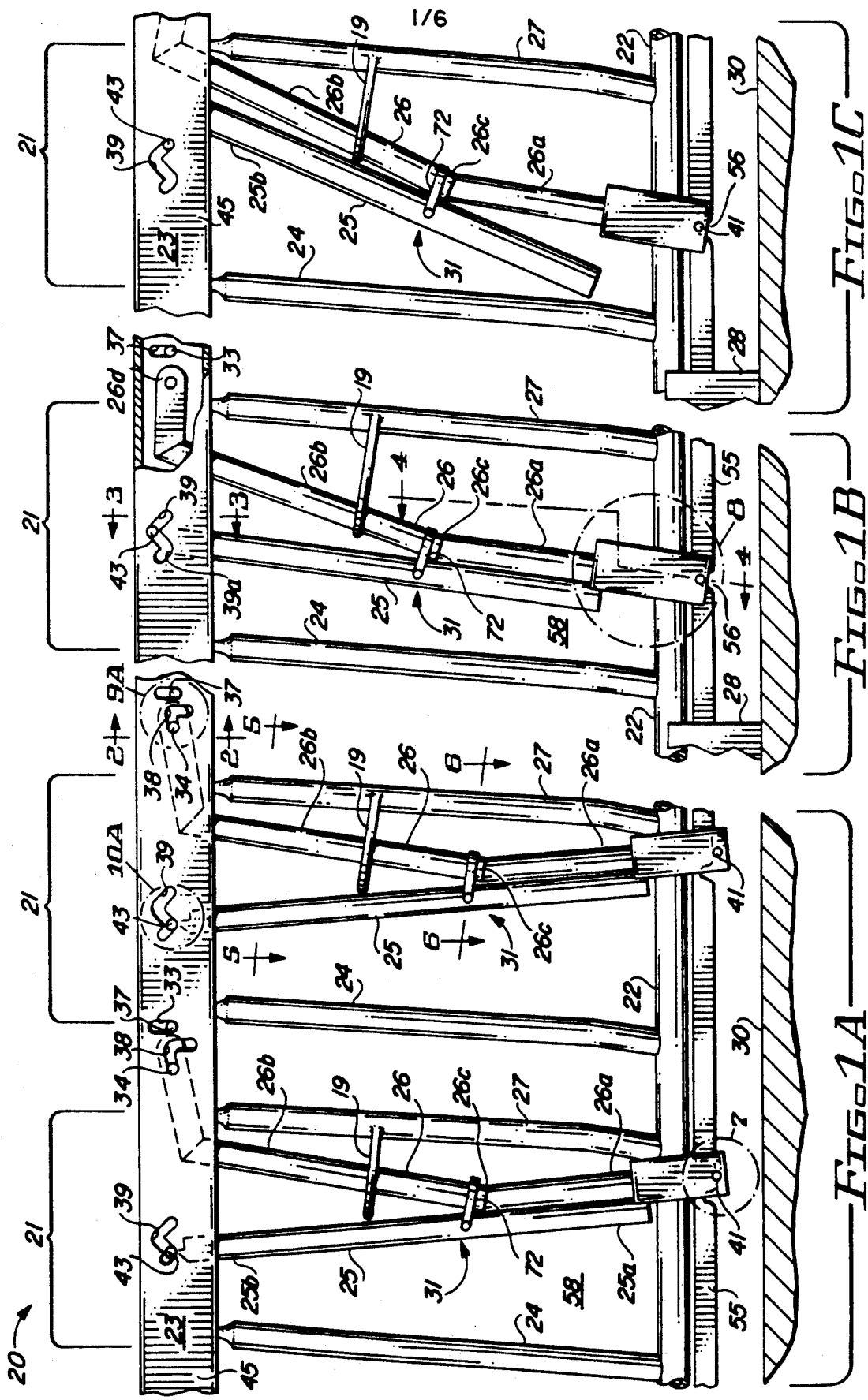

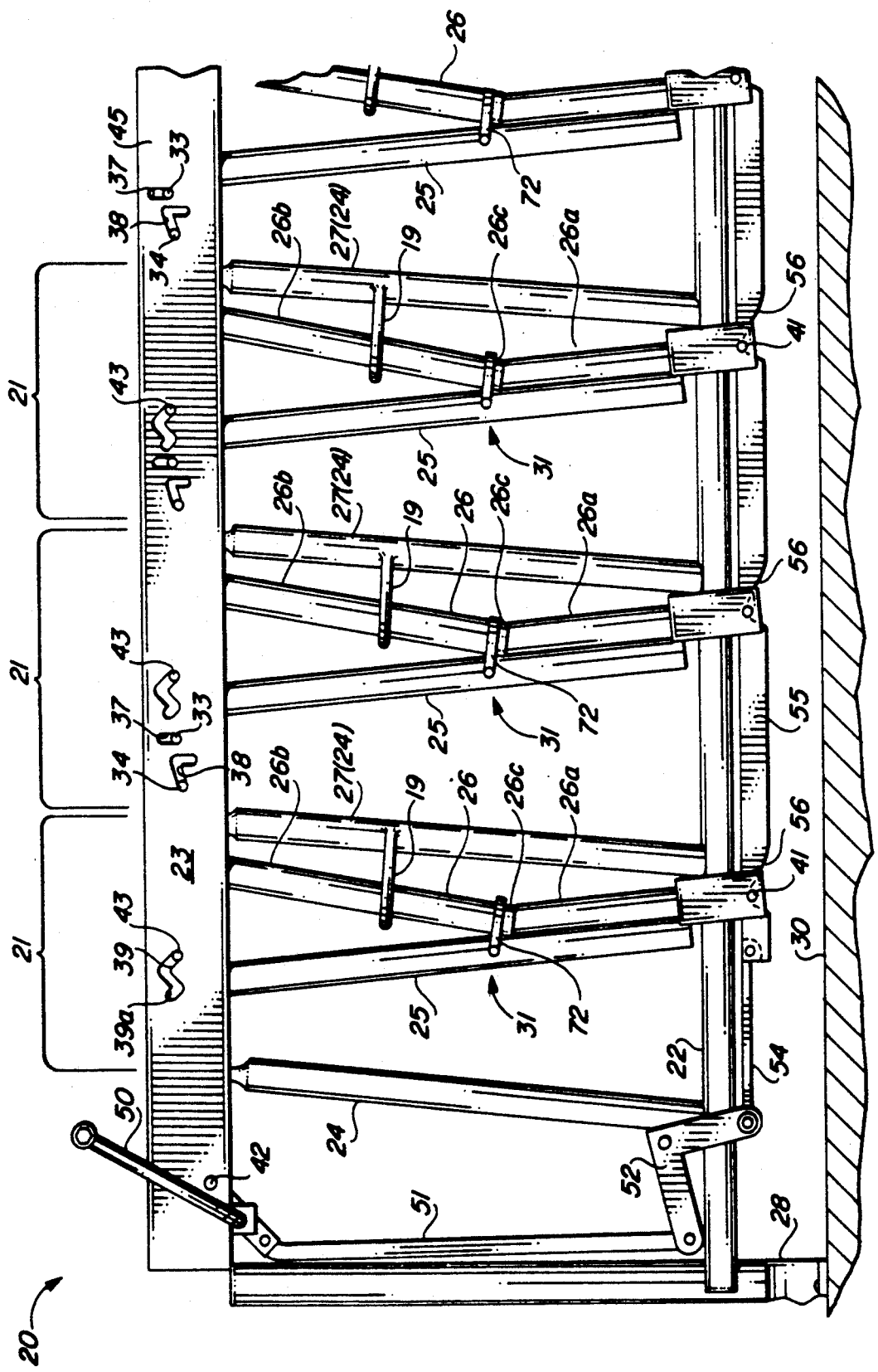

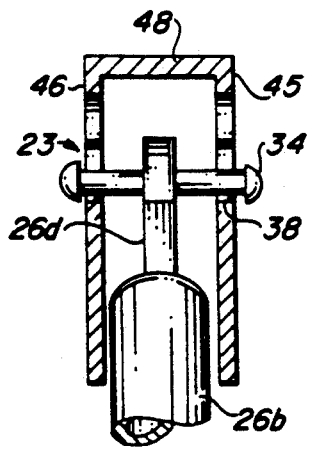
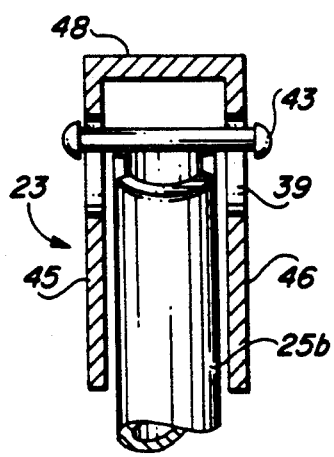
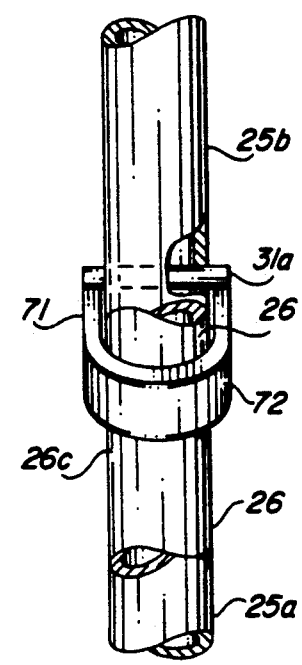
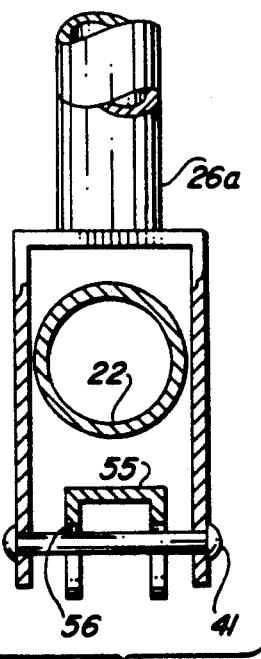
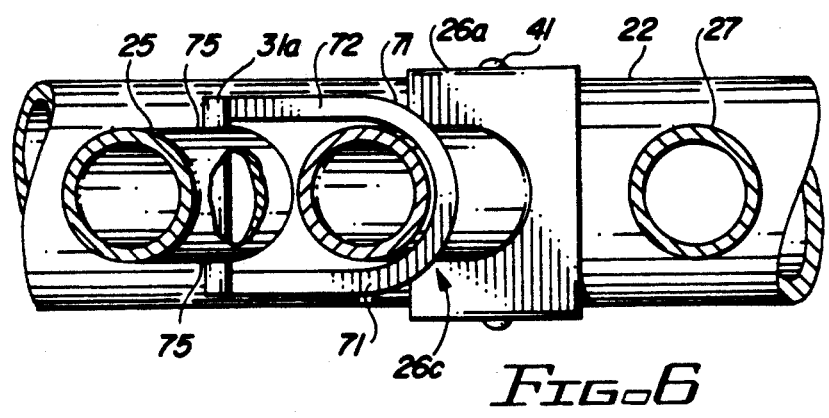

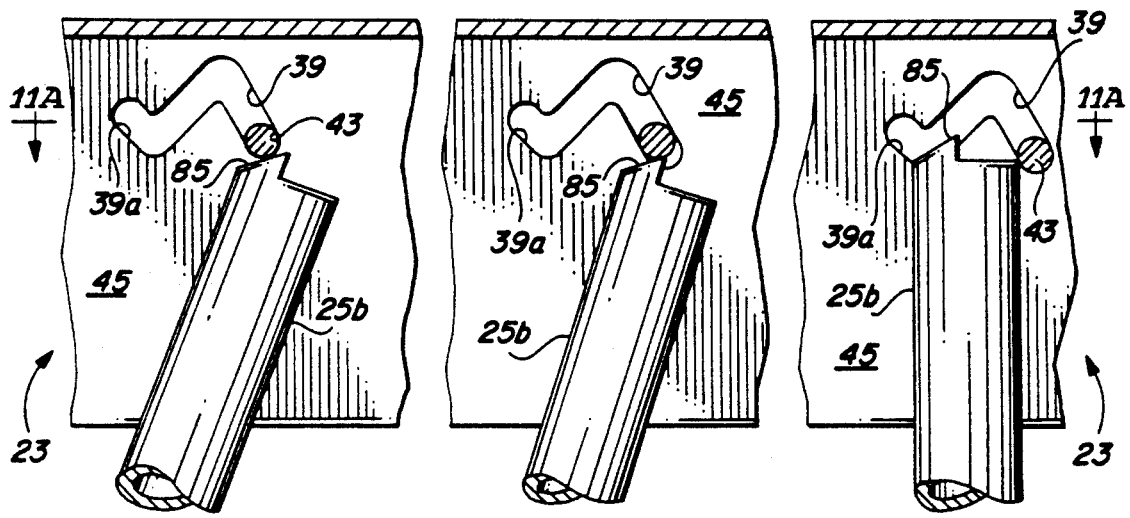
FIG_10A   FIG_10B   FIG_10C
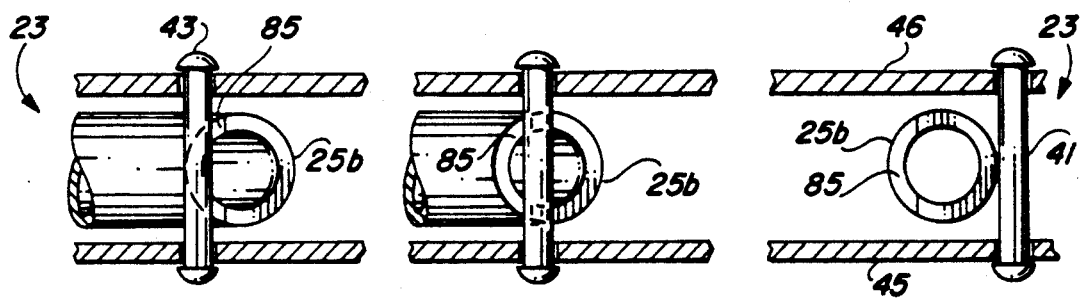
FIG_11A   FIG_11B   FIG_11C

SELF-LATCHING STANCHION AND OPERATOR SYSTEM

This invention relates to a latching and release system for cattle stanchions and the like, more particularly to such stanchions that are self-latching and operator releasable in either open or closed position. It is an object of the invention to improve the stanchion apparatus shown in the patent to Anderson, U.S. Pat. No. 4,457,265.

BACKGROUND OF THE INVENTION

Cattle stanchions for holding and releasing cows during milking, feeding and/or veterinary treating are well-known and exist in many varieties. The goal in improvements of these devices and their systems is to make an apparatus that is relatively easy to maintain and operate, and that permits the cattle to trap themselves. Also, an operator must be able to release the cattle individually or as a group.

For prior art devices of this nature, see patents to Albers U.S. Pat. No. 4,185,592, Albers U.S. Pat. No. 4,037,566, and particularly Anderson U.S. Pat. No. 4,457,265. In each of the Albers patents there is disclosed a cattle stanchion arrangement involving a fixed stanchion and a release stanchion which includes latching or locking mechanism carried on its upper end.

The Anderson patent provides an improved self-catch or latch stanchion operated in part by gravity and in which the opening and closing operating mechanism is independent of the latch/release mechanism. Also, a manual release mechanism is provided so that a cow may be released under the circumstances where the cow has fallen and needs to be released separately. Also see the following U.S. Pat. Nos.: 4,037,566 (Albers), 4,055,149 (Haiges), 4,150,638 (Vandenberg et al), 4,185,592 (Albers, Sr.), 4,377,131 (Vandenberg et al), 4,476,315 (Albers, Sr.), 4,495,897 (Albers, Sr.), 4,867,105 (Hatfield) and 4,930,452 (DaSilveira).

BRIEF SUMMARY OF THE INVENTION

The invention is an improved cattle stanchion having a frame whose basic elements are horizontal top and bottom frame means, and top frame brace means, e.g., braces between top and bottom frames.

The frame carries an animal control component which comprises: a support bar having upper and lower legs defining an angled knee intermediate the ends of the support bar, means for pivotally supporting the upper end of the bar in the top frame (suitably a support pin carried by the end of the bar and journalled in a slot in the top frame) and means for reciprocating the bottom end of the support bar lengthwise of the bottom frame and for causing the bottom end to dip during its reciprocating travel; and a vertically oriented animal restraint wand, means for pivotally engaging the restraint wand intermediate the ends thereof and adjacent the knee of the support means, and means for movably confining the travel of the upper end of the restraint wand in an arcuate, reciprocal path relative the top rail.

The presently preferred means for journalling the support pin in the frame means in a support pin slot adapted to receive the pin.

The preferred means for movably confining the travel of the upper end of the restraint wand in an arcuate, reciprocal path relative the top rail is, as presently preferred, an arcuate slot or slots (one in each side of the rail) in the top frame means and a guide pin carried in the slot.

The support pin slot is formed with horizontally and vertically oriented connecting legs. The lock pin is journalled in a lock pin slot or slots (one in each side of the rail) in the top frame, and normally resides in a first lower position in the lock pin slot that prevents the movement of the support pin in the support pin slot. The lock pin is moveable to a second upper position in the lock pin slot that permits the movement of the support pin in the support pin slot to permit the release and movement to the right of the support bar, the bottom of the support bar dropping below the bus bar in this position.

The cattle stanchion system is intended to take the form of a long row of stanchion sections, joined by the top and bottom frame means, wherein the means for reciprocating the bottom end of the support member lengthwise of the bottom frame means operates all of the stanchion sections in unison.

The cattle stanchion also provides means for preventing the pinching of an operator's hand between the upper portions of the support bar and the animal restraint wand by means of a detent, carried by a vertical brace means, extending past the upper leg of the support bar to engage and restrain the travel of the upper portion of the animal restraint wand.

Significant advantages accrue to the improvements, among which are:

The novel hinging of the support bar 26 in the top of the stanchion frame permits it to be moved from right to left, and vice versa, by means of a bus bar attached at the bottom. This design makes possible the setting of the various modes of the stanchion by simply speeding or slowing the movement of the bus bar by means of the operator handle.

When the handle is moved quickly the effect of the force of gravity is defeated. When it is moved at a slower rate gravity is given time to work. The attendant will select the speed depending on the mode being set.

In the bottom free feed mode, the restraint wand is held rigid which means that in the early period of a calf's life it can become accustomed to feeding through the stanchion without being intimidated by the restraint wand's swinging on its support.

In the top free feed mode, after the calf has become accustomed to feeding through the stanchion it needs to be trained to enter the stanchion through the top, moving the restraint wand as it lowers its head to feed, without being caught. After this habit has been developed the stanchion can be set for calves to catch themselves.

With respect to single and/or group cow/calf bottom discharge, typically cows and especially calves, when disturbed by the presence of the attendant will not exit from the top of the stanchion. Hinging the support bar 26 or animal restraint wand 25 in the top of the stanchion frame not only makes possible bottom exiting but also permits the maximum number of openings on a standard ten foot section, thus reducing costs.

In respect to single pin latching, animal restraint and release modes are set by speeding and slowing the bus bar, which in turn is made possible by hinging the wand support bar 26. This combination permits the utilization of a straight (commercially available) pin 34 for the latch. This single pin makes possible a feature that dairymen have needed for many years.

For example, as cows or calves are being treated veterinarily, an individual cow/calf may be released when struggling below the hinge point 31 of the restraint wand 25 by simply moving the pin to the top free feed mode. As the vet moves down the line, and the cow/calf calms down, she is free to exit from the top. When treatment is completed the attendant can reset the entire row of stanchions with the operator handle.

BRIEF DESCRIPTION OF THE DRAWING

Referring now to the drawing in which a presently preferred embodiment is illustrated:

FIGS. 1A–1C are elevation views of a series of stanchion sections showing relative positions in a movement between positions;

FIG. 1D is an elevation view showing the relationship between the operator crank and the stanchions in free feed mode;

FIG. 2 is a portion of the view of FIG. 1, in cross-section, taken along the lines 2—2 in FIG. 1A;

FIG. 3 is a portion of the view of FIG. 1, in cross-section, taken along the lines 3—3 in FIG. 1B;

FIG. 4 is a portion of the view of FIG. 1, in cross-section, taken along the lines 4—4 in FIG. 1B;

FIG. 5 is a portion of the view of FIG. 1, in cross-section, taken along the lines 5—5 in FIG. 1A;

FIG. 6 is a portion of the view of FIG. 1, in cross-section, taken along the lines 6—6 in FIG. 1A;

FIG. 10A is an enlarged segment of the apparatus of FIG. 1 corresponding to dotted circle 10A in FIG. 1A;

FIGS. 10B and 10C show stages of movement of the apparatus in 10A; and

FIGS. 11A, 11B and 11C are cross-sections of the view of FIGS. 10A–10C taken along the line 11A—11A of FIGS. 10A–10C.

DETAILED DESCRIPTION OF THE INVENTION

Figure 1G:
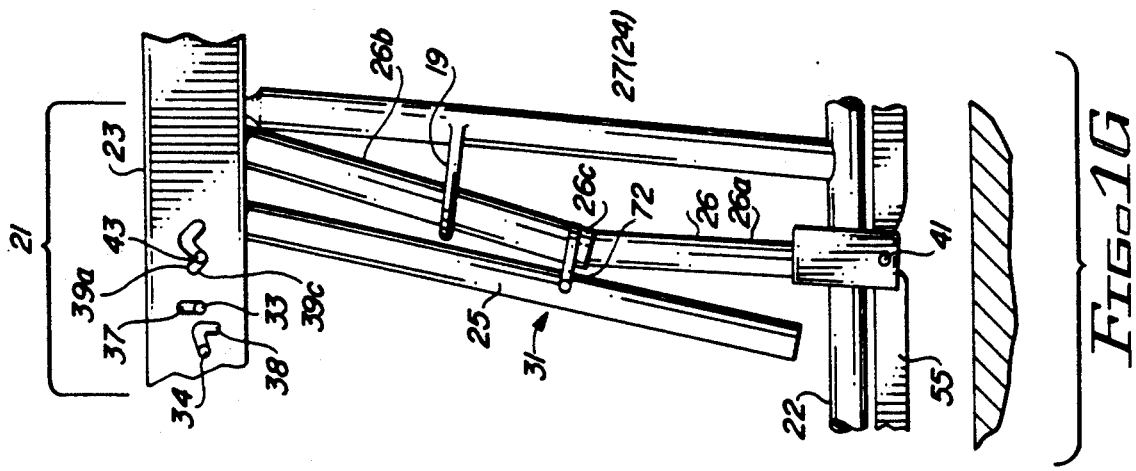
FIG. 1G is an elevation view showing the relationship between the operator crank and the stanchions in free feed top mode.

Referring to the drawings, wherein a presently preferred embodiment is shown, stanchion apparatus 20 includes a plurality of stanchion sections 21, each for an individual animal, e.g., cow or calf. The sections shown are, of course, exemplary, inasmuch as a much larger number of sections may be embodied in the system apparatus.

FIG. 2 shows the upper end 26d of the support bar 26 supported by means of pin 34 in slot 38 in frame member 23. The segment shown in this view corresponds to the segment shown in the view of FIG. 9A where support bar segments 26b and 26d are shown supported by pin 34 confined in slot 38.

FIG. 3 shows the relationship of animal restraint wand 25 to pin 43 in top frame member 23. This segment corresponds to the segment in the view of FIG. 10B, looking to the left as the bevel surface 85 raises pin 43.

FIG. 4 shows the relationship between the support bar 26 and the bus bar 55. The bottom part of lower leg 26a of support bar 26 by-passes bottom frame member 22 and carries pin 41. The latter engages notch 56 in bus bar 55 in all operating positions except the downed cow release position shown in FIG. 7. Clevis 72 is attached to bar 26 at 26C and to animal restraint wand 25 by pivot pin 31a as shown in the cutaway portion of wand 25.

FIG. 5 shows a cross section, above the knee 26c, of bar 26 where, from left to right, pin 31a pivotally engages wand 25 and clevis 72 is attached to bar 26. Also, position stop 19 attached to brace 27 encircles bar 26.

FIG. 6 is a cross-section showing the elements of FIG. 5 at a lower position about the level of the knee 26c of bar 26.

Figure 7:
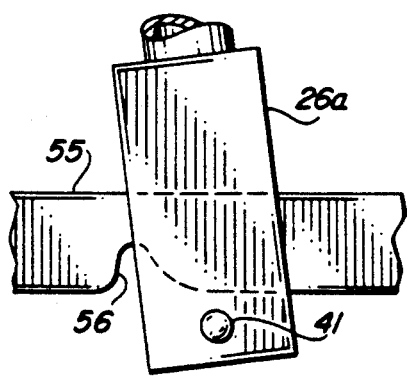
FIG. 7 is an enlarged segment of the apparatus of FIG. 1 corresponding to dotted circle 7 in FIG. 1A and to the position shown in FIG. 9D.

FIG. 7 shows in detail the relationship of the bottom 26a of the support bar 26 to the bus bar 55 in the downed cow release position. FIG. 7 corresponds to FIG. 9D wherein the support to release cycle shown in FIGS. 9A–9D culminates. In FIG. 7, the pin 41 has dropped away from its engagement with slot 56 to a point below the bus bar 55.

Figure 8:
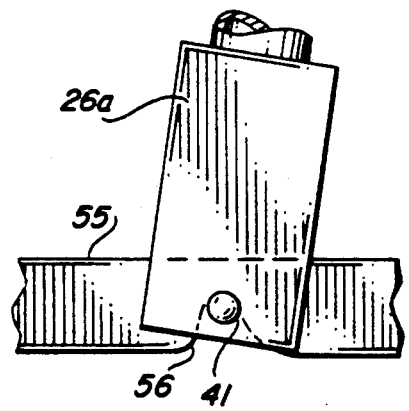
FIG. 8 is an enlarged segment of the apparatus of FIG. 1 corresponding to dotted circle 8 in FIG. 1B and corresponding to the position of FIG. 9A.
Figure 9A:
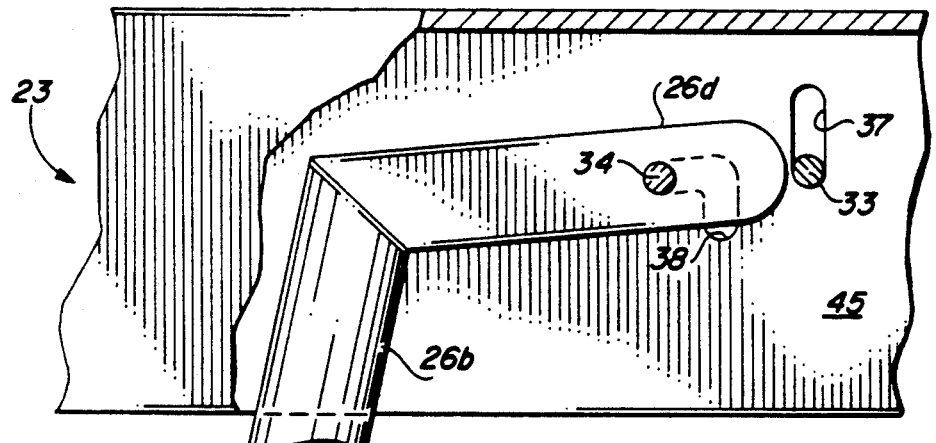
FIG. 9A is an enlarged segment of the apparatus of FIG. 1 corresponding to dotted circle 9A in FIG. 1A.

In FIG. 8, wherein pin 41 resides in notch 56 for normal operation, the position of the bus bar 55 corresponds to the operating position of the bus bar 55 shown in FIG. 9A (also see FIGS. 1A–1G, especially FIG. 1B where the top frame member 23 is cut away to show end 26d confined by pin 33) wherein the end 26d is restrained by pin 33.

Figure 9B:
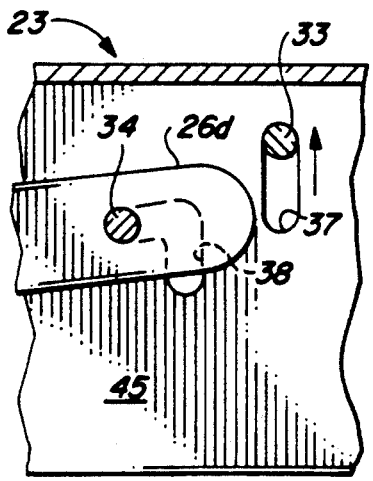
FIGS. 9B, 9C and 9D show stages of movement of the apparatus in 9A.
Figure 9C:
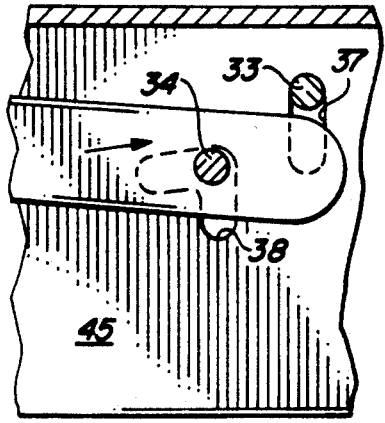
Figure 9D:
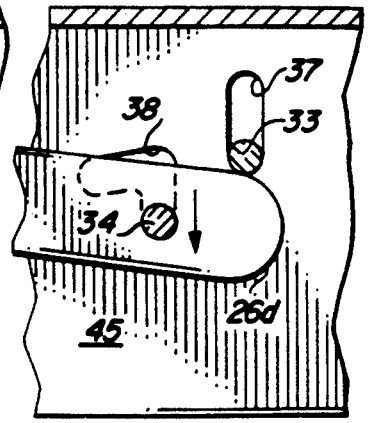

FIGS. 9A and 9D correlate to FIGS. 8 and 7 respectively. FIGS. 9B and 9C show the intermediate steps wherein the pin 33 is raised and the end 26d is being moved to the right in slot 38 under raised pin 33.

FIGS. 10A–10C illustrate successive movements of the restraint wand 25 as the bevel 85 raises pin 43, passes under pin 43 (FIG. 10B) and goes to the left of pin 43 (FIG. 10C) as pin 43 drops to the bottom of the right leg of slot 39 to confine wand 26 to its left.

FIGS. 11A–11C correspond directly to FIGS. 10A–10C.

Frame and Associated Components

The stanchion apparatus 20 includes a horizontal bottom frame member 22 and an upper top frame member or superstructure 23 which includes elements of the latching, releasing and operating mechanism and/or system to be described. Each stanchion section includes fixed brace members 24, 27 for bracing and supporting the horizontal frame members, especially the top frame, an animal restraint wand 25, a support bar 26 and an additional (in one embodiment) brace member 27, which may also serve as the fixed brace member 24 for the next stanchion section in line, as in FIGS. 1D–1F. The individual stanchion sections 21 may be spaced as far apart as is necessary or desired. The fixed upright brace members 24, 27 are attached to the bottom frame member 22 in any well known manner, such as by welding, the bottom frame member 22 in turn being attached by posts 28 to any suitable floor, e.g., a concrete floor 30. The upper ends of the fixed, bracing stanchion members 24, 27 are attached to the top frame member 23 by any suitable means.

A bus bar 55 is supported by means of the bottom frame member 22 and runs below member 22 and connects to each stanchion support bar 26.

It will be understood that all of the stanchion sections 21 will be the same, and only one stanchion section 21 need be specifically described.

The top frame member 23 may be formed of angle or zee members having sides 45 and 46, respectively, to form web. Slots 37, 38, 39 may be provided in each of the sides 45 and 46 and to receive pins 33, 34 and 43. These slots are conveniently referred to in the singular. The brace members 24, 27 may be welded or fixed by any convenient means. Top frame member 23 is double walled and has a web. It is provided with slots 39 on each side in the shape of an inverted U having left and right legs. A pin 43 residing in slots 39 in the top frame member 23 is moveable into two positions to cooperate in achieving the operating positions and advantages of one feature of the invention as will be described.

An additional two sets of pins 33 and 34, cooperate with two sets of slots 37 and 38 formed in top frame 23. Pin 33 moves vertically in slot 37. When in the down position it locks support bar 26 into place by confining end 26a. Pin 33 may be raised by hand so that pin 34 can move in slot 38 to release support bar 26.

Referring to the views of FIG. 1, the arrangement of the various parts and their operating functions may be described.

The Animal Restraint Means

As shown in FIGS. 1A-1G, 4-6, the support bar 26 includes a lower portion, or leg, 26a and an upper portion, or leg, 26b, the lower leg 26a being movably associated with the bus bar 55 and the upper leg movably confined in slots 38 formed in sides 45, 46 of the channel which comprises upper frame member 23. The upper leg 26b of support bar 26 is at an angle to the lower leg 26a so as to form an angle or knee 26c at the pivot area 31. The restraint wand 25 consists of two parts, or legs, 25a and 25b and is pivoted on the non-flexing knee 26c of the support bar 26 at pivot 31. The angularity of the upper bar leg 26b is such that when the upper wand leg 25b of the restraint wand 25 is disposed parallel to the leg 26b as in FIG. 1C, the space between leg 25b and brace member 24 is sufficiently large for a cow to put her head through the opening. This constitutes the open or catch position of the restraint wand 25. The pivot 31 is made with a steel strap 71 welded on each side to the knee 26c between legs 26a and 26b and a U-shaped round welded to steel strap 71 for a clevis 72. The bight connecting between the legs of the U-shaped clevis 72 actually forms a pivot pin 31a extending through a hole through an ovalled portion 75 between the upper and lower legs 25b and 25a. The ovalled portion 75 enables the pivot to be formed as shown without enlarging the space between the two parallel straps 71. The location of the hole for the clevis 72 is offset toward the left from the center line of the restraint wand 25.

It is a feature of this invention that the stanchion members are not vertical. As seen in FIGS. 1A-1F, they incline a few degrees to the right. The restraint wand 25 is thus heavier on the right hand side and will pivot to and stay in a desired position responsive to the operator's handle 50. Nevertheless, as will be explained, the operator can move the restraint wand 25 to several modes by means of handle 50.

Figure 1F:
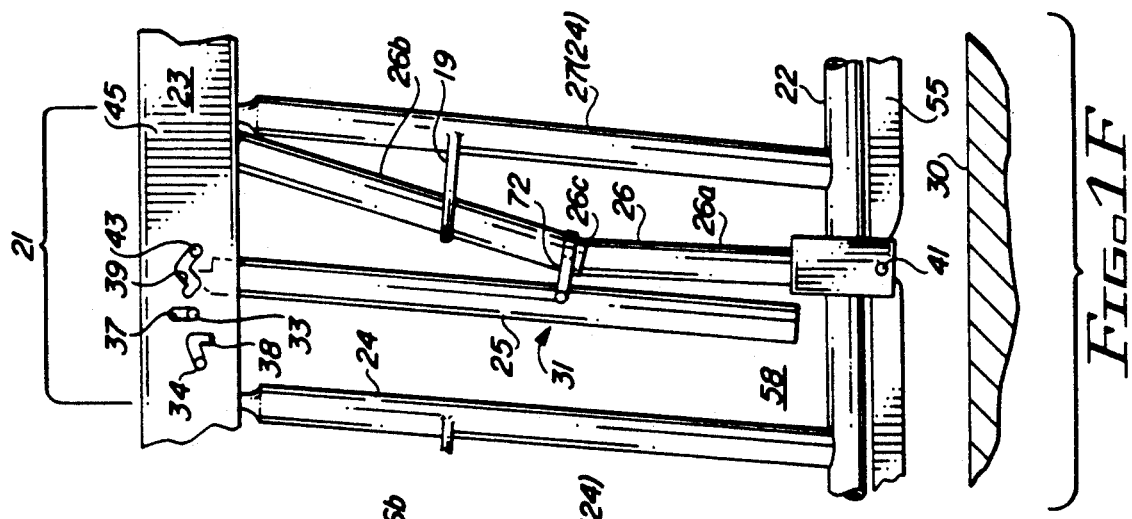
FIG. 1F is an elevation view showing the relationship between the operator crank and the stanchions in lock out mode.
Figure 1E:
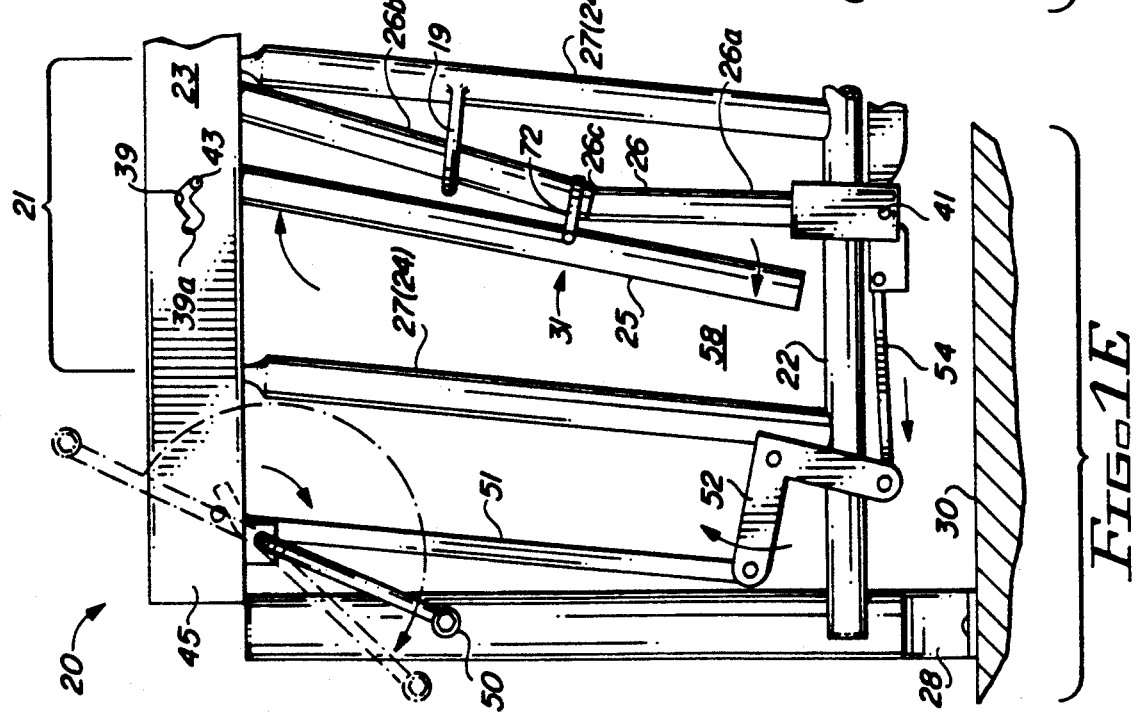
FIG. 1E is an elevation view showing the relationship between the operator crank and the stanchions in self catch mode.

When the restraint wand 25 is in its closed position, as in FIGS. 1B and 1F, its lower leg 25a is disposed parallel to the lower leg 26b of the support bar 26, and when the restraint wand 25 is in its open position, as in FIGS. 1C, 1E and 1G, the upper leg 25b is disposed more nearly but not quite parallel to the upper leg 26b of the support bar 26. (stop 19 prevents full closure to protect the operator's hand in a single cow release operation). The location of the pivot 31 in the restraint wand 25 and the corresponding knee portion of the support bar 26 are such that the upper leg 25b is substantially longer and heavier than the lower leg 25a. Thus, in any event, the upper leg 25b because of its weight predominates and will flop to one position or the other as shown in FIGS. 1A to 1F, either to lock in (or out) or to provide the open space for the free feed or self catch modes.

The Operating Positions

The restraint wand 25 may occupy three common positions: a self-catch position as shown in FIGS. 1C, 1E and 10A; a closed position as shown in FIGS. 1F and 10C, and an open (bottom free feed mode) position as shown in FIGS. 1A and 1D. In the vertical or closed position of restraint wand 25, the space between brace member 24 and restraint wand 25 defines a narrow space which does not permit entry or withdrawal of a cow's head. When the restraint wand 25 is in the open or release position, as shown in FIG. 1E, the space becomes large enough to permit the cow to remove her head.

Under various conditions it is intended that a cow may enter the stanchion with the wand 25 in the open self-catch position, as in FIGS. 1C, 1E, so that a cow may insert and lower her head to feed, whereupon the cow's neck comes into contact with lower leg 25a and cause the restraint wand 25 to pivot counter-clockwise about the pivot point 31 to the vertical position as shown in FIGS. 1F and 10C. After reaching this position the restraint wand 25 automatically locks into place (pin 43 restrains it) and the cow is confined in the stanchion by restraint wand 25 and brace member 24.

As will be described hereinafter, the operator can release the restraint wand 25 which, under the influence of gravity will pivot clockwise to the position shown in FIG. 1E, whereupon the cow may remove its head and move out of the stanchion.

The latching, releasing and locking mechanisms to be subsequently described function not only to enable the cow to capture herself, as described above, but also permit a human operator to individually release a downed cow, to release the herd as a group, or lock them in or out.

The left and right legs of slot 39 facilitate two different operating positions of restraint wand 25, the wand 25 being placed in one of a series of positions determined by the operation of bus bar 55 responsive to operating handle 50.

As shown in FIGS. 1A-F, 9A-D and 8, the end 26d of support bar 26 is restrained by pin 33 at its upper end and by bottom pin 41, engaging bus bar 55, at its bottom end. The support bar 26 is thus operatively engaged in all except the downed animal release position.

In the operating position of FIG. 10C, the restraint wand 25 is positively locked in its closed position by pin 43 thereby defining the space between restraint wand 25 and brace member 24 in its narrow aspect. If a cow's neck is in the space under this condition the cow cannot remove its head from the space. This is a lock-in position. In the lock-in position the animal may have blood drawn or any other test conducted upon it and cannot escape. If the restraint wand 25 is set in the position of FIG. 10C and 1F before the cow arrives, the cow cannot put her head into the space between brace member 24 and restraint wand 25. In that position, the section is in a lock-out mode and feed may be charged to the feed bin without interference from the cows. The operation of the latching mechanism for this and other modes, will be further described.

In another position of the structure, the catch mode shown in FIG. 1E, the bevelled surface of the end of upper leg 25b of the restraint wand 25 rests against latch pin 43 in the right leg of slot 39 as best shown in FIG. 10A. The latch pin 43 is then ready for a cow to put her head into the open space and, by lowering her head, cause her neck to engage leg 25A of restraint wand 25, whereupon the wand 25 pivots toward the left, bevels and raises latch pin 43, passes pin 43 which falls by weight of gravity after the end of leg 25b passes, and the restraint wand 25 is confined by latch pin 43 after it falls, as in FIGS. 1F and 10C. This causes the cow to be latched into a caught position. (In this position of the latching mechanism, support bar 26 may nevertheless be manipulated and a particular cow released, if desired.)

Handle 50 is provided for moving the restraint wands 25, as a group, into the various operating positions. The handle 50 is connected to a crank arm 51 which operates bell crank 52 linked to bus bar 55 through linkage arm 54.

When it is desired that all cows are to be released as a group, the operating handle 50, as shown in FIG. 1E, is moved at any speed, in a counterclockwise direction, to move the bus bar 55 in a dipping movement toward the right to open each stanchion section (see FIG. 1D).

When the handle 50 is rotated either clockwise or counterclockwise to an upper or lower end position, the bus bar is moved by means of bell crank 52 and pivotally connected intermediate linkage 54 either left or right, describing a shallow U-shaped dip in the movement either way between the left and right positions.

With the structure as thus far described in mind further structure may be described and the operation understood by referring to the various individual operating positions of the apparatus as illustrated in FIGS. 1A to 1G.

Three operating positions are considered and are exemplified, respectively, in FIGS. 1C and 1F.

Self-Catch Function

Position 1 (FIG. 1C) is considered first in explaining the sequence of operation, and may be referred to as the self-catch and single release position. In this position, it may be considered that the restraint wand 25 is in the open position, that is the upper leg 25b is disposed toward the right and is resting against the position stop 19. The space is large enough to pass a cow's head. This is the position of the apparatus when the feed has been charged to the feed bin in preparation for the cows, which approach the stanchion and place their heads through the openings, lower their heads to begin feeding, and trip the catch. The cows are then captured for milking or other operations.

As described, when a cow lowers her head to feed, her neck comes into contact with leg 25a and causes the restraint wand 25 to pivot from the position shown in FIG. 1C to the closed position shown in FIG. 1F. As best shown in FIGS. 10A-C and 11A-C, the very upper end of leg 25b has a bevelled surface 85. As the leg 25b pivots counterclockwise under the influence of the cows neck against the leg 25a, the angle surface 85 comes against the pin 43 and causes it to rise in the right leg of slot 39. As the pin 43 moves upwardly, the end of the leg 25b including the bevel surface 85 glides underneath it and moves beyond it, as in the full closed position shown in FIG. 1F, the pin 43 falls under the influence of gravity behind the upper end of the leg 25b of the restraint wand 25. In this position the upper end 25b of the restraint wand 25 is caught to the left of pin 43, thus holding the restraint wand 25 in its closed position. The cow under these circumstances cannot remove her head because the restraint wand 25 cannot pivot against the holding or latching influence of the pin 43 bearing against the side of the restraint wand 25.

Single Release Function—Wand Release

With the restraint wand 25 and the latch pin 43 in the lock-in position, individual cows can nevertheless be released by an attendant by raising the ends of the pin 43 (e.g., with his thumb and forefinger) and rotating upper leg 25b of the restraint wand 25 clockwise under pin 43 to create the larger opening which permits the cow to remove her head.

Single Release Function—Support Bar

A downed cow is a special problem. It might not be possible to release the cow by aid of latch pin 43 from the lock-in position because the cow still presses on the bottom of leg 25a, preventing release. In that event the support bar 26 may be released by raising pin 33, which normally restrains end 26d so that lateral segment 26d can be moved to the right (see FIGS. 1A, 1B and FIGS. 9A-9D) and down in slot 38. At the same time the bottom end 26a falls away from its residence in notch 56 of bus bar 55 (as seen in detail in FIG. 7) to permit the whole of support bar 26 to be moved to the right to further enlarge the opening at the bottom of the head space 58. This opens the head space 58 adequately to remove a downed cow.

Free Feed Function

From the self catch position as shown in FIG. 1C the restraint wand 25 may also be moved by the operator into the free feed mode or position as in FIG. 1A or to the lock-out position of FIG. 1F. The position of FIG. 1A may be referred to as the single movement total release (of all sections) and non-catch position of the restraint wand 25, and the position/mode of FIG. 1F may be referred to as the positive lock-in or lock-out position of the restraint wand 25.

It is also necessary to prevent injury to the operator's hand when he pulls the support bar 26 to the right to release a downed cow. This is accomplished by provider stop 19 which leave a space 18 between legs 25b and 26b as seen in FIG. 1A.

Use of the Stanchion Handle

In the foregoing sections several stanchion functions have been discussed. Although 15-20 minutes of practice in manipulating the manufactured mechanism is sufficient to grasp the technique of use, it may be helpful to discuss several handle movements to illustrate the principles involved. The daily routine of a milking operation involves the basic cycle of confining the cows for feeding and milking, releasing them and getting ready to confine the next group of cows.

To begin such a cycle, assuming that the stanchions are in lock-out position as in FIG. 1F (which is identical to the lock-in position), and the attendant wishes to commence feeding in the self-catch position, the attendant lifts the handle slowly to horizontal. A slight pause is helpful to allow the restraint wand 25 time to pass under pin 43 and fall by force of gravity (the bus bar 55 has come to rest in a downward dip while the handle pauses) to the "self catch" position as in FIG. 1-E; then the handle is lowered again clockwise to the bottom. As the bus bar 50 dips the restraint wand 25 moves under the pin 43 and tips over to the self-catch position due to the restraint wand's off-plumb orientation (the vertical bars are not plumb but deviate a few degrees from vertical) and off-center pivot point 30.

Now the stanchions are in the "self-catch" position of FIG. 1C. Each stanchion will be moved to the "lock in" position of FIG. 1F by the cow that uses it to feed. As described, this is the self-catch feature of the invention.

To release the cows as a group from the lock-in position the operating handle 50 is moved at any speed, from bottom to top, counterclockwise, thus moving the bus bar 55 in a dipping movement from left to right and causing the stanchions to open to the bottom free feed position as in FIG. 1D.

To reset the stanchions to the lock-out positions from the bottom free feed position, the handle is brought down rather quickly clockwise, from the top to the bottom. If done quickly enough the wand stays to the left of the pin because there is not enough time for gravity to cause wand 25 to tip to the right. This completes the cycle. From the lock-out position the stanchions can be reset again to the self-catch position as described above.

The stanchions also may be moved to a free feed position from the lock-out/lock-in position. The bus bar 55 describes a semi-circular downward arc as the bus bar 55 moves from either left or right in response to movement of the handle 50 up or down. If the handle 50 is moved quickly from the lock-out/lock-in position, the restraint wand 25 stays in place and the shift is between lockout to free feed.

FIGS. 1D and 1G show the stanchion section mechanism in two different free feed positions: bottom free feed and top free feed, respectively. The animals can feed from a feed trough on the other side of the stanchion and withdraw at will in either free feed mode. The top free feed mode of FIG. 1G is used for calf training, as discussed in a prior section of this specification. In top free feed the slot 39a allows room to push aside the pin 43 when the cow bends down to feed and contacts restraint wand 25.

In the usual cycle from self catch to lock-in to group release to lock-out to self catch, the pin will remain in the right leg of slot 39. The handle 50 and linkage to bus bar 55 will serve to move the pin 43 from the left leg of slot 39 to the right leg, but not from the right leg to the left leg. Left leg positions for releasing an animal or training calves must be set by hand.

For some operations the attendant may wish to reset the left leg pin to the right leg of slot 39. To do so, the attendant would first disengage the stop pin 42 (see FIG. 1D) in upper frame member 23 to permit the operator handle 50 to rotate farther clockwise and by means of linkage to the support bar 26, move the bus bar 55 farther left, thus lifting each restraint wand 25 in the system that is in the position of FIG. 1A to engage the pin 43 and carry it up to the apex of slot 39 as in FIG. 1B. At this position (FIG. 1B) the restraint wand 25 tilts to the right by the force of gravity moving the pin 43 over the apex to the right leg of slot 39 to the 1C self-catch position. The attendant then reinserts the stop pin 42 in upper frame member 23 to confine the play of operator handle 50.

While the presently preferred embodiments of the invention are described and depicted in this specification, other equivalent means and structures will readily occur to those skilled in the art, all of which are intended to be embraced by the appended claims.

What is claimed is:

1. A cattle stanchion comprising:
   A. a frame comprising:
      1. horizontal top and bottom frame means, and
      2. top frame brace means;
   B. animal control means comprising:
      1. a support bar having upper and lower ends, and having upper and lower legs defining an angled knee intermediate the ends of said support bar,
      2. means for pivotally supporting the upper end of said bar in said top frame means,
      3. means for reciprocating the lower end of said support bar lengthwise of said bottom frame means,
      4. a vertically oriented animal restraint wand having upper and lower ends,
      5. means for pivotally engaging said restraint wand, intermediate the ends thereof, adjacent said knee of said support bar, and
      6. means for movably directing the travel of the upper end of said restraint wand in an arcuate, reciprocal path relative said top frame means.

2. The cattle stanchion of claim 1 wherein said means for reciprocating the lower end of said support bar lengthwise of said bottom frame means further comprises means for causing said lower end to dip during its reciprocating travel.

3. The cattle stanchion of claim 1 wherein said means for pivotally supporting the upper end of said support bar in said top frame means comprises a support pin, carried by said upper end of said bar, and journalled in said top frame means.

4. The cattle stanchion of claim 3 wherein the means for said journalling of said support pin in same frame means is a support pin slot adapted to receive said pin.

5. The cattle stanchion of claim 3 wherein said support pin slot adapted to receive said support pin further comprises horizontally disposed and vertically disposed connecting legs, lock pin means journalled in a lock pin slot in said top frame means, said lock pin residing in a first position in said lock pin slot that prevents the movement of said support pin in said support pin slot, and moveable to a second position in said lock pin slot that permits the movement of said support pin in said support pin slot.

6. The cattle stanchion of claim 1 wherein said means for movably directing the travel of the upper end of said restraint wand in an arcuate, reciprocal path relative said top frame means comprises an arcuate slot in said top frame means and a guide pin carried by the upper end of said wand.

7. The cattle stanchion of claim 1 further comprising a plurality of stanchion sections disposed in a row and joined by said top and bottom frame means.

8. The cattle stanchion of claim 7 wherein said means for reciprocating the lower end of said support bar lengthwise of said bottom frame means operates the plurality of stanchion sections in unison.

9. The cattle stanchion of claim 1 further comprising means for preventing the pinching of an operator's hand between the upper ends of said support bar and said animal restraint wand.

10. The apparatus of claim 9 wherein said means for preventing the pinching of an operator's hand between the upper portions of said support bar and said animal restraint wand further comprises detent carried by a vertical brace means and extending past the upper end of said support bar to engage and restrain the travel of the upper end of said animal restraint wand.

* * * * *